United States Patent [19]

Morita et al.

[11] Patent Number: 5,060,717
[45] Date of Patent: Oct. 29, 1991

[54] AIR CONDITIONER

[75] Inventors: Keiichi Morita, Fujinomiya; Akihiko Sugiyama; Oserojoin Watabiki, both of Fuji; Mithuo Murano, Fujinomiya, all of Japan

[73] Assignee: Kabushiki Kaisha Toshiba, Kawasaki, Japan

[21] Appl. No.: 451,797

[22] Filed: Dec. 18, 1989

[30] Foreign Application Priority Data

Dec. 20, 1988 [JP] Japan ................................ 63-321145

[51] Int. Cl.$^5$ ........................... F24F 7/00; B03C 3/01; B03C 3/14
[52] U.S. Cl. ..................................... 165/53; 165/119; 165/58; 165/122; 55/124; 55/126; 55/133
[58] Field of Search ................... 165/58, 119, 53, 122; 55/124, 126, 133; 62/78

[56] References Cited

U.S. PATENT DOCUMENTS

| | | | |
|---|---|---|---|
| 2,933,151 | 4/1960 | Kurtz | 55/124 |
| 3,626,668 | 12/1971 | Cardiff | 55/126 |
| 3,747,300 | 7/1973 | Knudson | 55/126 |
| 4,772,297 | 9/1988 | Anzai | 55/126 |

FOREIGN PATENT DOCUMENTS

| | | | |
|---|---|---|---|
| 2917155 | 12/1979 | Fed. Rep. of Germany | 55/124 |
| 0168047 | 12/1981 | Japan | 165/119 |
| 0060433 | 4/1985 | Japan | 55/126 |
| 0232442 | 11/1985 | Japan | 165/58 |
| 0013938 | 7/1987 | Japan | 165/122 |
| 63-29023 | 2/1988 | Japan . | |

*Primary Examiner*—John Ford
*Attorney, Agent, or Firm*—Cushman, Darby & Cushman

[57] ABSTRACT

An indoor unit of an air conditioner includes a heat exchanger, through which room air circulates in a predetermined direction, and an air cleaner, The air cleaner includes an electric duct collecting portion for capturing fine duct in the circulating air, a filter portion for absorbing the odor from the circulating air, and a control unit for controlling the operations of the indoor unit and the collecting portion. The collecting portion, filter portion, and control unit are arranged side by side in a direction intersecting the predetermined direction so that filter portion is situated between the collecting portion and the control unit.

9 Claims, 4 Drawing Sheets

AIR CONDITIONER

BACKGROUND OF THE INVENTION

1. Field of the Invention

The present invention relates to an air conditioner with an air cleaner.

2. Description of the Related Art

Conventional air conditioners incorporate an air cleaner which serves to remove fine dust and odors in room air circulated by the conditioner. In general, the air cleaner includes an electric dust collecting portion and a deodorizing filter, which are arranged upstream of a heat exchanger of an indoor unit of the air conditioner. The dust collecting portion is provided with a plurality of ionization wires, connected to the positive side of a high-voltage power source, and an opposite electrode member including a plurality of electrode plates which are opposed individually to the ionization wires.

In the conventional air cleaner, the electric dust collecting portion and the deodorizing filter are arranged upstream of the heat exchanger so as to overlap each other in the flowing direction of air. In this arrangement, the room air flows serially through the dust collecting portion and the filter into the heat exchanger. Thus, the introduced air is subject to a substantial pressure loss which is attributable to the air resistance of the dust collecting portion and the filter. In consequence, the efficiency of the air conditioner is reduced.

A control portion for controlling the air conditioner and the dust collecting portion is located adjacent to the collecting portion. Thus, the control portion may be adversely affected by noises attributable to electric discharge of the dust collecting portion, or by leakage current produced in case of poor insulation in the high-voltage power source.

Moreover, since the deodorizing filter is adjacent to the electric dust collecting portion, the filter may possibly be ignited by the electric discharge of the dust collecting portion.

SUMMARY OF THE INVENTION

The present invention has been contrived in consideration of these circumstances, and its object is to provide an air conditioner with an air cleaner, in which the pressure loss of introduced air is small enough to ensure improved efficiency, and which is less susceptible to noises and leakage current.

In order to achieve the above object, an air conditioner is designed according to the present invention which comprises an indoor unit arranged in a space to be air-conditioned, the unit including a heat exchanger and circulating means for causing air in the space to circulate in a predetermined direction through the heat exchanger; and an air cleaner incorporated in the indoor unit, the cleaner including an electric dust collecting portion located on the upstream side of the heat exchanger, with respect to the predetermined direction, and which is used to capture fine dust in the circulating air, and a filter portion located on the upstream side of the heat exchanger, with respect to the predetermined direction, and which is used to absorb the odor from the circulating air, the dust collecting portion and the filter portion being arranged side by side in a direction intersecting the predetermined flow direction.

In the air conditioner constructed in this manner, room air flows into the heat exchanger only through the dust collecting portion or the filter portion. Therefore, the pressure loss of the introduced air can be made smaller than in the case of a conventional apparatus in which the room air passes through both the dust collecting portion and the filter. Thus, the efficiency of the air conditioner can be improved.

Preferably, in the present invention, the air cleaner is provided with a control portion for controlling the operations of the air conditioner and the electric dust collecting portion. This control portion is located side by side with the dust collecting portion and the filter portion in a direction that intersects the predetermined flow direction so that the filter portion is situated between the dust collecting portion and the control portion.

With this arrangement, the control portion can be kept a greater distance from the electric dust collecting portion, so that the adverse influence of noises on the control portion, caused by electric discharge of the dust collecting portion or by leaking current from the power source within the dust collecting portion, can be reduced.

BRIEF DESCRIPTION OF THE DRAWINGS

FIGS. 1 to 7 show an air conditioner according to an embodiment of the present invention, in which:

FIG. 1 is a perspective view of an indoor unit of the air conditioner with its front panel lifted;

FIG. 2 is a sectional view of the indoor unit;

FIG. 3 is a front view of the indoor unit with its cabinet removed;

FIG. 4 is a front view of an air cleaner cleared of an opposite electrode member;

FIG. 5 is a sectional view of the cleaner taken along line V—V of FIG. 3;

FIG. 6 is an enlarged perspective view showing part of a dust collector of a deodorizing filter; and FIG. 7 is a schematic view showing the connection of the dust collector.

DETAILED DESCRIPTION OF THE PREFERRED EMBODIMENT

An embodiment of the present invention will now be described in detail with reference to the accompanying drawings.

Figure 1:
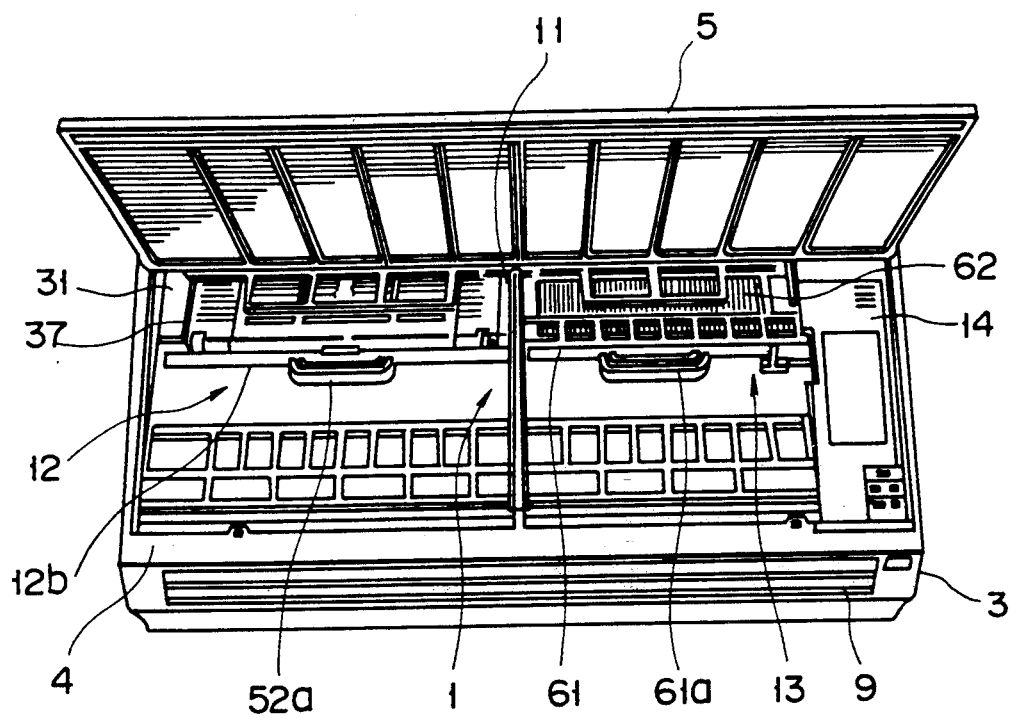
Figure 2:
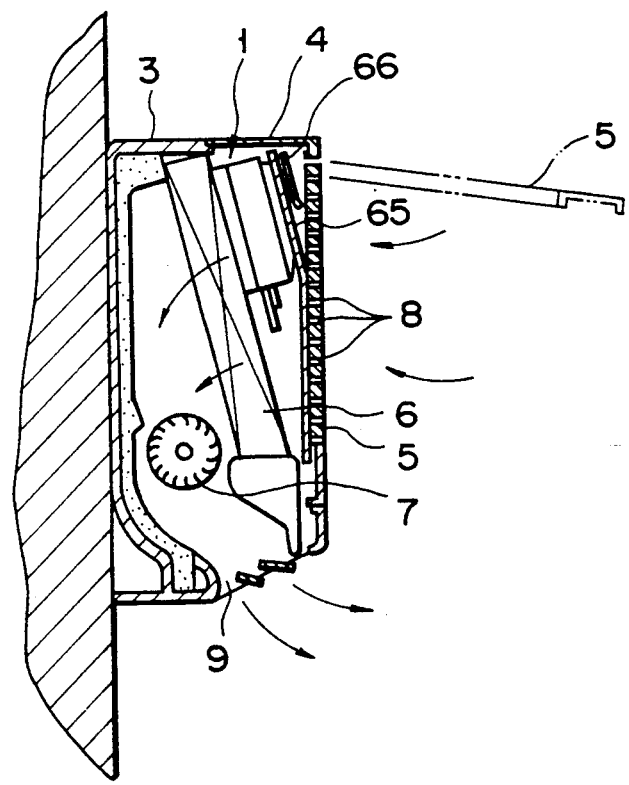

FIGS. 1 and 2 show an indoor unit of an air conditioner according to the embodiment of the present invention. The indoor unit comprises cabinet 3, which contains indoor-side heat exchanger 6, air cleaner 1, fan 7, etc.

Cabinet 3 includes front panel 4, which has front plate 5 swingable around its top end portion. The inside of cabinet 3 can be exposed by swinging front plate 5 to an open position shown in FIG. 1 and indicated by a two-dot chain line in FIG. 2.

As seen from FIG. 2, heat exchanger 6 is arranged in cabinet 3 so that it is inclined at an angle to a vertical plane, and more specifically, its upper end portion is situated nearer to the rear wall of the cabinet than its lower end portion is. Inside cabinet 3, fan 7 is located at the lower portion behind the heat exchanger. When fan 7 is driven, room air is circulated as indicated by arrows in FIG. 2. The room air is sucked into cabinet 3 via inlet apertures 8 of front plate 5, passed through heat exchanger 6 to be subjected to heat exchange, and then blown off through an outlet aperture 9 at the lower end of front panel 4 into a room.

Figure 3:
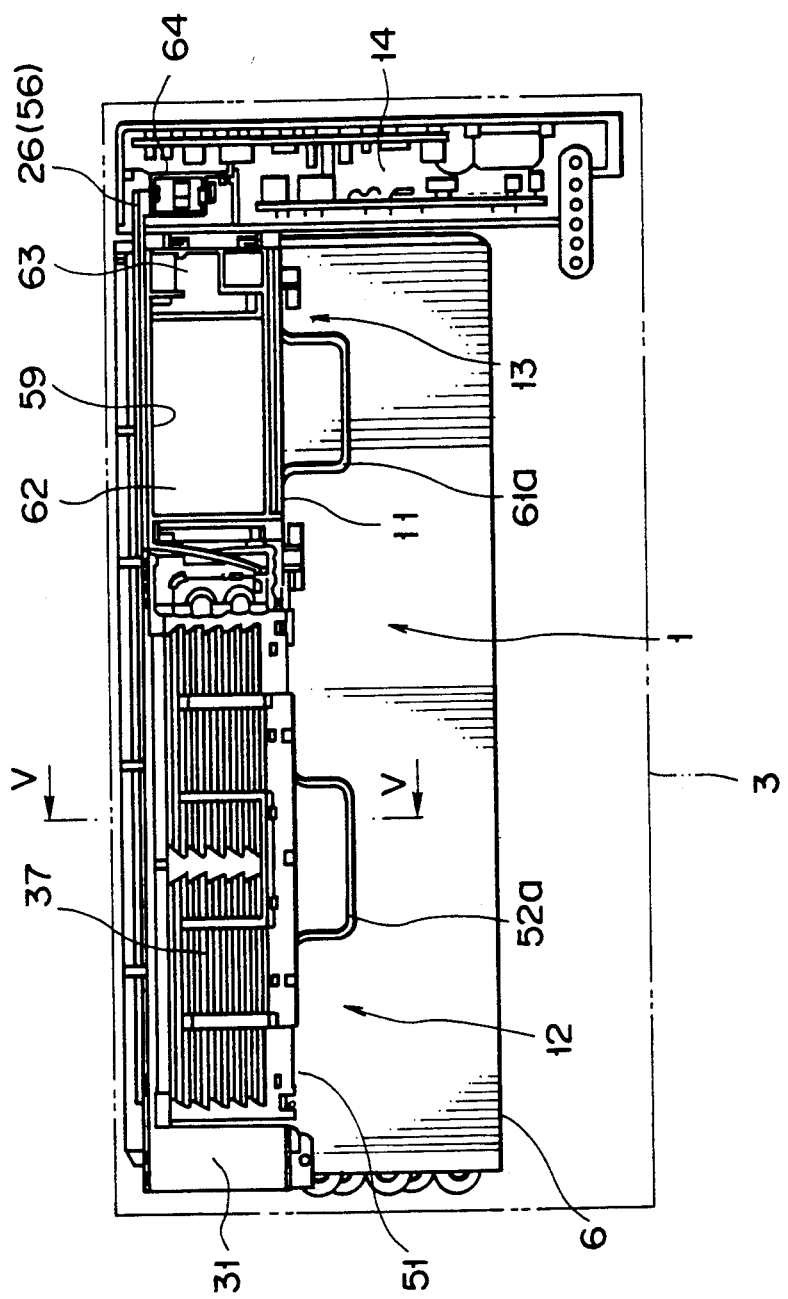
Figure 4:
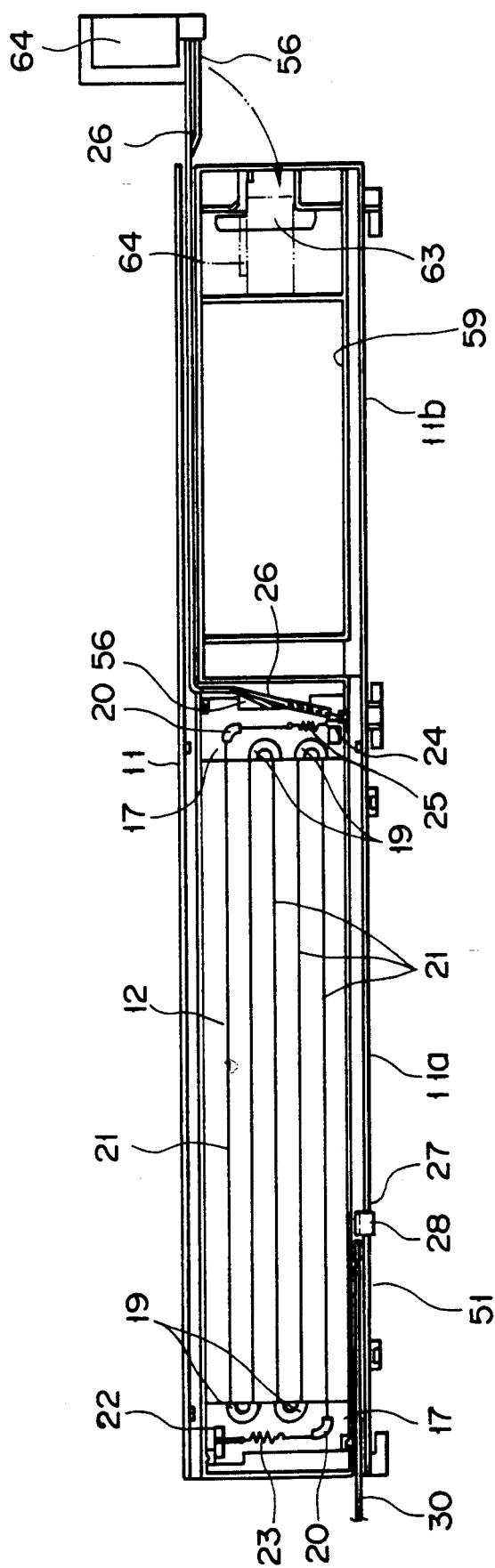
Figure 5:
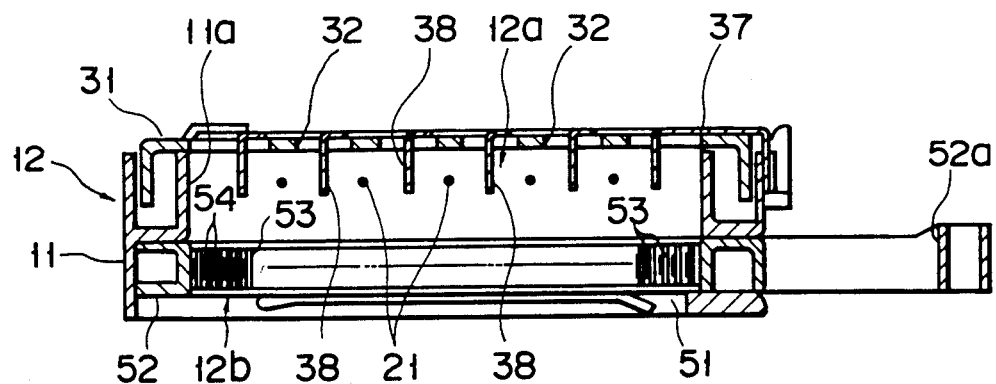

Air cleaner 1 is fixed to cabinet 3 so as to face the upstream side of heat exchanger 6. As shown in FIGS. 3 to 5, cleaner 1 has an elongated rectangular main frame 11 which, extending horizontally, is fixed to cabinet 3 so as to be inclined at approximately the same angle as heat exchanger 6. Frame 11 is formed of left- and right-hand frame sections 11a and 11b which adjoin each other substantially in the center of frame 11. Electric dust collecting portion 12 and filter portion 13 are arranged in frame sections 11a and 11b, respectively. Control portion 14 for controlling the operations of the air conditioner and dust collecting portion 12 is located on the right of filter portion 13, inside cabinet 3. Thus, portions 12, 13 and 14 are successively arranged side by side in the horizontal direction perpendicular to the direction of air circulation.

As shown in FIG. 4, insulating block 17 is removably attached to each end of left-hand frame section 11a. A pair of semicircular retaining portions 19 and fan-shaped retaining portion 20 protrude from the top face of each block 17 so as to be spaced from one another. One ionization wire 21 is anchored successively to retaining portions 19 and 20 so that it is stretched in multiple passes between the two insulating blocks.

Thus, wire 21 has a plurality of straight portions 21a which extend horizontally between blocks 17, with a fixed spacing between each adjacent straight portion. One end of ionization wire 21 is secured to fixed portion 22 on left-hand block 17 through spring 23. The other end of wire 21 is connected to contact tab 24 on right-hand block 17 through spring 25. Springs 23 and 25 serve to prevent wire 21 from sagging. One end of first lead wire 26 is connected to tab 24.

Ground 28 is attached to the lower end portion of frame section 11a. Ground 28 is formed by bending an elastic metal plate in the shape of a U, and partially projects outward from frame 11 through notch 27 at the lower end of frame section 11a. One end of second lead wire 30 is connected to ground 28.

As shown in FIGS. 3 to 5, rectangular cover plate 31 is removably attached to frame 11 so as to cover the front of frame section 11a. Cover plate 31 has a plurality of slits 32 which extend horizontally over the whole distance between insulating blocks 17. Each slit is opposed to its corresponding space between each two adjacent straight portions 21a of ionization wire 21.

Opposite electrode member 37 is removably mounted on cover plate 31. Member 37 is formed, for example, by bending both end portions of a rectangular stainless-steel plate at right angles and rectangularly raising a plurality of portions of the plate. The resulting raised strips constitute a plurality of electrode plates 38. When electrode member 37 is mounted on cover plate 31, each electrode plate 38 is passed through its corresponding slit 32 and located between its corresponding two adjacent straight portions 21a of ionization wire 21. Plates 38 extend parallel to straight portions 21a, over the whole distance between insulating blocks 17. Thus, each straight portion 21a is situated between its corresponding two adjacent electrode plates 38. Ground 28 is in contact with the inner surface of one of the bent end portions of electrode member 37. Left-hand frame section 11a, ionization wire 21, and opposite electrode member 37 constitute ionization portion 12a of electric dust collecting portion 12.

As shown in FIG. 5, first retaining portion 51, which is formed at left-hand frame section 11a, is situated behind ionization portion 12a, between the ionization portion and heat exchanger 6. Dust collector 12b, which, in conjunction with ionization portion 12a, constitutes electric dust collecting portion 12, is removably fitted into retaining portion 51. Collector 12b includes rectangular frame 52 and a number of belt-shaped plastic sheets 53 stacked and retained in layers at predetermined intervals in frame 52. Grip portion 52a is formed integrally on the lower surface of frame 52 and projects from main frame 11. A user can remove collector 12b from retaining portion 51 by holding and pulling grip portion 52a.

Figure 6:
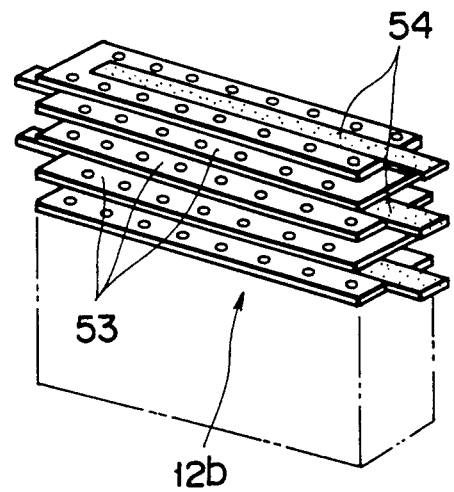
Figure 7:
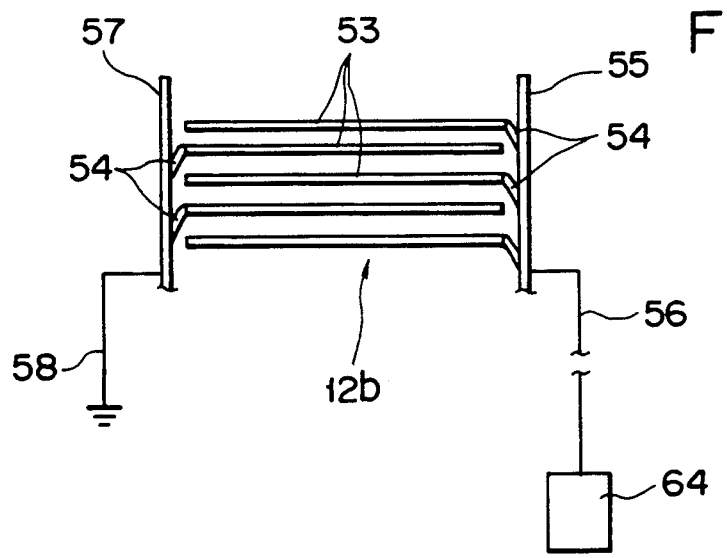

As shown in FIGS. 6 and 7, conductive layer 54 is formed on one surface of each sheet 53 by applying, for example, a conductive coating thereto. Conductive layers 54 of alternate ones of sheets 53, that is, those of half of the sheets, project for a predetermined length from one end of each corresponding sheet, and are in contact with first electrode 55 which is fixed to frame 52. One end of third lead wire 56 is connected to electrode 55. Conductive layers 54 of the remaining sheets project for the predetermined length from the other end of each corresponding sheet, and are in contact with second electrode 57 which is fixed to frame 52. Electrode 57 is grounded by means of fourth lead wire 58.

As shown in FIGS. 1, 3 and 4, right-hand frame section 11b of main frame 11 includes second retaining portion 59, and rectangular case 61 is removably fitted into retaining portion 59. Deodorizing filter 62, formed of e.g. activated charcoal, is housed in case 61. Grip portion 61a, which projects downward from frame 11, is formed integrally on the lower end of case 61. The user can draw out case 61 from retaining portion 59 by holding and pulling grip portion 61a. Right-hand frame section 11b and deodorizing filter 62 constitute filter portion 13.

As shown in FIG. 4, temporary holder portion 63 for high-voltage power source (mentioned later) is formed at the right end portion of right-hand frame section 11b. Holder portion 63 is adapted to hold power source 64, as indicated by two-dot chain line in FIG. 4, before air cleaner 1 is incorporated in the air conditioner. The other ends of first and third lead wires 26 and 56 are connected to power source 64. Thus, lead wires 26 and 56 connect ionization portion 12a and dust collector 12b directly with high-voltage power source 64, without having any junctions between the two. In this arrangement, there is no possibility of leakage current or electric shock, which may possibly be caused by junctions in the middle of lead wires. In consequence, the safety of the system can be improved.

Since high-voltage power source 64 can be housed in temporary holder portion 63 at right-hand frame section 11b, the air cleaner can be installed without hindrance to the power source 64 even though power source 64 is previously connected by means of lead wires 26 and 56 without junctions in the middle. Thus, after air cleaner 1 is incorporated in the air conditioner, power source 64 is set in control portion 14 beside right-hand frame section 11b, as shown in FIG. 3.

As shown in FIGS. 1 and 2, air filter 65, used to capture relatively large-sized dust particles, is removably mounted between the lower-half of heat exchanger 6 and front plate 5 and between air cleaner 1 and front plate 5. Filter 65 is retained by means of filter retainer 66 formed inside front panel 4.

With the air conditioner constructed in this manner, the air sucked into cabinet 3 via inlet apertures 8 of front plate 5 first passes through air filter 65, wherein relatively large-sized dust particles are captured by the filter. Some of the sucked air flows through electric dust collecting portion 12 into heat exchanger 6. Fine dust in the air is ionized by electric discharge from ionization wires 21, and is captured by dust collector 12b. Air which does not enter the electric dust collecting portion 12 passes through filter portion 13 to be deodorized thereby, and then flows into heat exchanger 6. After undergoing heat exchange in heat exchanger 6, the air flows through outlet aperture 9 of cabinet 3 into the room.

The air conditioner with the aforementioned construction has the following advantages.

Electric dust collecting portion 12 and filter portion 13 are arranged side by side in a direction intersecting the air circulating direction on the inlet side of heat exchanger 6. In this arrangement, the flow resistance and pressure loss of the airflow can be made smaller than in the case where the dust collecting portion and the filter portion are arranged in series. Thus, the operating efficiency of the air conditioner can be improved. Moreover, the driving load of fan 7 can be reduced, so that the noise level of the fan can be lowered.

Dust collecting portion 12, filter portion 13, and control portion 14 are arranged side by side in the horizontal direction so that the filter portion is located between the collecting portion and the control portion. Accordingly, the distance between portions 12 and 14 can be made long enough to reduce the influence of noise from dust collecting portion 12 on control portion 14. Also, the creeping distance between portions 12 and 14 can be made so long that control portion 14 cannot be adversely by leakage current caused by poor insulation at the collecting portion. Thus, poor operation of the control portion attributable to noise or leakage current can be prevented, so that the reliability of the air conditioner can be improved.

Since dust collecting portion 12 and filter portion 13 a arranged so that air flows through them in parallel, air cleaner 1 can be made relatively thin, so that the indoor unit of the air conditioner can be made smaller with the present embodiment, heat exchanger 6 is inclined at an angle to a vertical plane, and a holding space is defined between the upper portion of the heat exchanger and the front plate. Since air cleaner 1 is arranged in this holding space, the indoor unit can be made even smaller.

Furthermore, since portions 12 and 13 are arranged in parallel a deodorizer of the filter portion is less likely to ignitions caused by electric discharge from the dust collecting portion. Thus, the safety of the system can be improved.

It is to be understood that the present invention is not limited to the embodiment described above, and that various changes and modifications may be effected therein by one skilled in the art without departing from the scope or spirit of the invention.

In the above embodiment, for example, the electric dust collecting portion, filter portion, and control portion are arranged side by side in the horizontal direction. It is necessary, however, only that these portions be arranged in a direction which intersects the direction of air circulation. For example, the three portions may be arranged vertically.

What is claimed is:

1. An air conditioner comprising:
   an indoor unit arranged in a space to be air-conditioned, said unit including a heat exchanger and circulating means for causing air in the space to circulate in a predetermined direction through the heat exchanger;
   an air cleaner incorporated in the indoor unit, said cleaner including an electric dust collecting portion located on an upstream side of the heat exchanger, with respect to said predetermined direction, for capturing dust in the circulating air, a filter portion located on the upstream side of the heat exchanger, with respect to said predetermined direction, for absorbing the odor from the circulating air, said dust collecting portion and said filter portion being arranged side by side in a direction intersecting the predetermined direction; and
   control means for controlling the operations of the indoor unit and the air cleaner, said control means being located side by side with the dust collecting portion and the filter portion, in said intersecting direction, the filter portion being situated between the dust collecting portion and the control means.

2. An air conditioner according to claim 1, wherein said indoor unit includes a cabinet having a front plate with air inlet apertures and containing the heat exchanger and air cleaner, said heat exchanger being inclined at an angle to the front plate and having a top end portion situated at a distance from the front plate and a bottom end portion adjoining the front plate, said air cleaner being located between the top end portion of the heat exchanger and the front plate.

3. An air conditioner according to claim 2, wherein said circulating means includes a fan arranged in the cabinet, said fan being situated on the downstream side of the heat exchanger, with respect to said predetermined direction, and situated next to the bottom end portion of the heat exchanger.

4. An air conditioner according to claim 1, wherein said air cleaner includes an elongated frame extending in said intersecting direction, said frame having a first section provided with the dust collecting portion and a second section provided with the filter portion.

5. An air conditioner according to claim 4, wherein said dust collecting portion includes ionization means for ionizing fine dust in the circulating air and a collector for capturing the ionized dust.

6. An air conditioner according to claim 5, wherein said collector is removably fitted in the first section.

7. An air conditioner according to claim 4, wherein said filter portion includes a case removably fitted in the second section and a deodorizer contained in the case.

8. An air conditioner according to claim 4, wherein said air cleaner includes a power source for supplying high-voltage current to the dust collecting portion, and said frame includes a holder portion adapted temporarily to hold the power source.

9. An air conditioner according to claim 8, wherein said holder portion is located on the opposite side of the filter portion to the dust collecting portion, with respect to the direction intersecting said predetermined direction.

* * * * *